United States Patent
Carlsson et al.

(10) Patent No.: US 7,811,347 B2
(45) Date of Patent: Oct. 12, 2010

(54) CENTRIFUGAL SEPARATOR

(75) Inventors: Claes-Göran Carlsson, Tullinge (SE);
Jan Skoog, Skogås (SE); Tommy Myrvang, Tullinge (SE); Rolf Ridderstråle, Stockholm (SE)

(73) Assignee: Alfa Laval Corporate AB, Lund (SE)

( * ) Notice: Subject to any disclaimer, the term of this patent is extended or adjusted under 35 U.S.C. 154(b) by 207 days.

(21) Appl. No.: 12/279,119

(22) PCT Filed: Jan. 12, 2007

(86) PCT No.: PCT/SE2007/050015

§ 371 (c)(1),
(2), (4) Date: Sep. 16, 2008

(87) PCT Pub. No.: WO2007/094726

PCT Pub. Date: Aug. 23, 2007

(65) Prior Publication Data

US 2009/0000258 A1 Jan. 1, 2009

(30) Foreign Application Priority Data

Feb. 13, 2006 (SE) .................................. 0600310

(51) Int. Cl.
*B01D 46/18* (2006.01)
(52) U.S. Cl. .............................. 55/406; 55/400; 55/407; 55/447; 55/467; 55/455; 55/385.3; 55/424; 55/428; 55/451; 55/423
(58) Field of Classification Search ........... 55/400–407, 55/447, 467, 455, 385.3, 424, 428, 451, 423
See application file for complete search history.

(56) References Cited

U.S. PATENT DOCUMENTS 2,335,420 A * 11/1943 Jones ........................ 184/6.24

(Continued)

FOREIGN PATENT DOCUMENTS

JP 61074614 A * 4/1986

(Continued)

OTHER PUBLICATIONS

PCT International Search Report and Written Opinion; International Application No. PCT/SE2007/050015; Date Filed Jan. 12, 2007; Date Mailed Aug. 28, 2008.

*Primary Examiner*—Jason M Greene
*Assistant Examiner*—Dung Bui
(74) *Attorney, Agent, or Firm*—Michaud-Kinney Group LLP

(57) ABSTRACT

In a centrifugal separator for cleaning a gas comprising liquid impurities, a stationary casing encloses a separation space having an inner wall surface. The separator comprises an inlet for the gas. A rotating member rotates around and brings the gas to rotation for separation of at least a main part of the liquid impurities from the gas. A gas outlet is provided downstream the rotating member for discharge of the cleaned gas. A first liquid outlet discharges the liquid impurities and comprises an outlet hole. An annular surface extends inwardly from the wall surface and is located downstream the outlet hole. The first liquid outlet comprises an annular shield element extending from the annular surface at a distance and radially inside the outlet hole. The shield element and the annular surface form an annular groove radially inside the outlet hole.

20 Claims, 5 Drawing Sheets

U.S. PATENT DOCUMENTS

| | | | |
|---|---|---|---|
| 2,507,897 A * | 5/1950 | Tullio | 96/318 |
| 3,234,716 A * | 2/1966 | Sevin et al. | 210/360.1 |
| 3,447,290 A * | 6/1969 | Flory | 55/322 |
| 4,198,218 A * | 4/1980 | Erickson | 55/408 |
| 4,478,718 A * | 10/1984 | Saget | 210/512.3 |
| 5,693,125 A * | 12/1997 | Dean | 96/157 |
| 6,547,862 B2 * | 4/2003 | Dean | 96/174 |
| 6,755,896 B2 * | 6/2004 | Szepessy et al. | 95/270 |
| 6,783,571 B2 * | 8/2004 | Ekeroth | 95/8 |
| 6,821,319 B1 * | 11/2004 | Moberg et al. | 95/270 |
| 7,022,150 B2 * | 4/2006 | Borgstrom et al. | 55/338 |
| 7,022,163 B2 * | 4/2006 | Olsson et al. | 95/268 |
| 7,033,411 B2 * | 4/2006 | Carlsson et al. | 55/406 |
| 7,056,363 B2 * | 6/2006 | Carlsson et al. | 55/406 |
| 7,077,881 B2 * | 7/2006 | Franzen et al. | 55/401 |
| 7,081,146 B2 * | 7/2006 | Hallgren et al. | 55/401 |
| 7,156,901 B2 * | 1/2007 | Hallgren et al. | 95/270 |
| 7,235,177 B2 * | 6/2007 | Herman et al. | 210/360.1 |
| 7,338,546 B2 * | 3/2008 | Eliasson et al. | 55/406 |
| 7,465,341 B2 * | 12/2008 | Eliasson | 96/281 |
| 7,476,266 B2 * | 1/2009 | Hallgren et al. | 55/406 |
| 7,569,094 B2 * | 8/2009 | Kane et al. | 95/28 |
| 7,632,326 B2 * | 12/2009 | Stemmer | 55/400 |
| 7,662,220 B2 * | 2/2010 | Fukano et al. | 55/401 |
| 7,682,415 B2 * | 3/2010 | Mueller et al. | 55/434 |
| 2004/0214710 A1 | 10/2004 | Herman et al. | |
| 2005/0198932 A1 * | 9/2005 | Franzen et al. | 55/406 |
| 2006/0117723 A1 * | 6/2006 | Yoo | 55/428 |
| 2007/0084161 A1 * | 4/2007 | Yoo | 55/345 |
| 2007/0163215 A1 * | 7/2007 | Lagerstadt | 55/406 |
| 2007/0199284 A1 * | 8/2007 | Yoo et al. | 55/345 |
| 2008/0047239 A1 * | 2/2008 | Zheng et al. | 55/337 |

FOREIGN PATENT DOCUMENTS

| | | |
|---|---|---|
| SE | 454954 | 6/1988 |
| SE | 523690 | 5/2004 |
| SE | 527718 | 5/2006 |
| WO | 2004024297 A1 | 3/2004 |

\* cited by examiner

CENTRIFUGAL SEPARATOR

FIELD OF THE INVENTION

The present invention refers generally to a centrifugal separator for cleaning of gases from liquid impurities, such as oil particles and oil mist.

BACKGROUND

SE-C-523 690 discloses a centrifugal separator which is intended for cleaning a gas containing liquid impurities in the form of oil particles and/or oil mist. The gas outlet for the cleaned gas extends in the known centrifugal separator from a lower part of the separation space. Above the gas outlet, there is a radial shield element which forms an annular surface extending into the separation space. Above, i.e. upstream, the shield element at a distance therefrom, there are a number of outlet holes for discharge of the separated oil from the separation space. An axial shield element extends, according to one embodiment, upwardly from the radial shield element, but is located axially beneath, i.e. axially downstream, of the outlet holes. The separated oil is caught by the inner wall of the separation space and flows downwardly towards the outlet holes. The technique disclosed in SE-C-523 690 is based on the phenomenon that the shield element will create an annular gas cushion immediately above the shield element, and that this gas cushion will stop the downwardly flowing oil at the level of the upper end of the gas cushion and at the level of the outlet holes so that the oil may be discharged through the outlet holes.

The liquid impurities, for instance oil, which deposit on or are located in a layer adjacent to the annular surface of the radial shield element, which extends into the separation space, will be conveyed radially inwardly towards the centre of the separation space along this surface since the rotation of the gas flow in this layer is decelerated by the friction to the non-rotating shield element.

The applicant has found out that a part of the downwardly flowing oil will pass the gas cushion and said shield element, which means that this part of the oil will follow the cleaned gas out from the centrifugal separator through the gas outlet.

The outlet holes of the known centrifugal separator are generally equidistantly located along the periphery of the casing. This means that the oil that is discharged through the holes has to be collected outside the casing for the transport to a common outlet.

SUMMARY

An object of the present invention is to provide a centrifugal separator which is capable of separating liquid impurities from a gas. Furthermore, it is aimed at a centrifugal separator which substantially inhibits separated liquid impurities from being remixed with gas before the gas leaves the centrifugal separator.

This object is achieved by a centrifugal separator wherein a first liquid outlet comprises an annular shield element, which extends from the annular surface at a distance from the outlet hole and which is located radially inside the outlet hole, wherein the annular shield element and the annular surface together form a groove located radially inside the outlet hole.

By means of such a groove, liquid impurities flowing along the inner wall surface will be caught. The liquid impurities move at a relatively high velocity in a rotating path along the direction of rotation. The liquid impurities will be collected in the groove and flow in the direction of rotation in the groove. Due to the fact that the gas rotates in the separation space, the liquid impurities, which reach the annular surface, will be conveyed inwardly on the annular surface. By means of a shield element according to the invention, such an inward flowing may be substantially prevented. The liquid impurities will instead be collected in the groove and, when they reach the level of the outlet hole, be discharged out from the separation space. Consequently, the groove forms a kind of dead-end for the liquid impurities. The shield element and the groove with respect to the axis of rotation are located radially inside the outlet hole, i.e. extend passing the outlet hole in the axial direction, so that liquid impurities will be substantially prevented from passing the shield element to the gas outlet.

According to one embodiment, the groove has an open annular upstream end and a closed annular downstream end. The upstream end may be located axially upstream the downstream end of the outlet hole, and preferably also axially upstream the upstream end of the outlet hole.

According to a further embodiment, the annular surface extend inwardly from the annular shield element.

According to yet a further embodiment, the first liquid outlet comprises a first annular collecting channel, which extends around the separation space radially outside the groove and preferably outside the inner wall surface. In such a way, the separated liquid impurities will be collected in an easy and convenient manner from the groove, and may thereafter be conveyed away from the centrifugal separator by means of one single conduit. Advantageously, the outlet hole extends between the groove and the first collecting channel in such a way that the liquid impurities flowing in the direction of rotation in the groove in an easy manner may be discharged to the first annular collecting channel.

According to a further embodiment, the annular surface comprises at least one opening located inside the annular shield element and forming a part of the gas outlet. Said at least one opening may comprise a central through-flow opening and/or a number of intermediate through-flow openings, which may be located at substantially the same or different radial distances from the axis of rotation.

According to a further embodiment, each such intermediate through-flow opening comprises a tongue projecting from an edge of the through-flow opening. By means of such tongues, an efficient conversion of the tangential gas flow to a substantial axial gas flow downstream the disc is achieved, and thus an efficient increase of the gas flow through the centrifugal separator. In such a way, the efficiency of the centrifugal separator may be further improved. Advantageously, the tongue projects from the edge in such a way that the tongue is located upstream the annular surface, which leads to an increased gas flow in comparison with if the tongues were provided downstream the annular surface. Furthermore, the tongues may project from the respective edge towards the direction of rotation and from the annular surface towards the rotating member. Consequently, the tongues will function as guide vanes guiding the tangential gas flow in through the through-flow openings. The through-flow openings and the tongues may have a substantially arched extension in the direction of rotation, which has an advantageous influence on the gas flow.

According to a further embodiment of the invention, the annular surface is substantially planar and parallel to a cross-sectional plane through the centrifugal separator. The annular surface may also be slightly conical or domed.

According to a further embodiment of the invention, the centrifugal separator comprises a second liquid outlet, which is provided upstream of the first liquid outlet. Advantageously, the second liquid outlet may then form a main outlet and the first liquid outlet a residual outlet. By such an arrangement, the separation of substantially all liquid impurities from the gas to be cleaned is achieved, and a substantially clean gas will leave the centrifugal separator via the gas outlet.

According to a further embodiment, the second liquid outlet comprises a second annular collecting channel extending around the separation space radially outside the inner wall surface. Furthermore, the second liquid outlet may comprise at least one outlet hole extending between the separation space and the second annular collecting channel.

According to a further embodiment, the centrifugal separator is arranged to be provided in such a way that the axis of rotation extends substantially vertically, wherein the stationary casing has an upper end and a lower end and wherein the gas outlet is provided at the upper end. The second liquid outlet may then be provided at the lower end, wherein a main part of the liquid impurities will flow along the inner wall surface down to the second liquid outlet. A probably lesser part of the liquid impurities will due to the upwardly flowing gas flow be transported upwardly along the inner wall surface to the groove and the first liquid outlet.

According to a further embodiment of the invention, the rotating member comprises a number of separating discs, which for instance may be conical, radial or axial.

BRIEF DESCRIPTION OF THE DRAWINGS

The invention is now to be explained more closely through a description of various embodiments disclosed by way of example and with reference to the drawings attached hereto.

DETAILED DESCRIPTION

Figure 1:
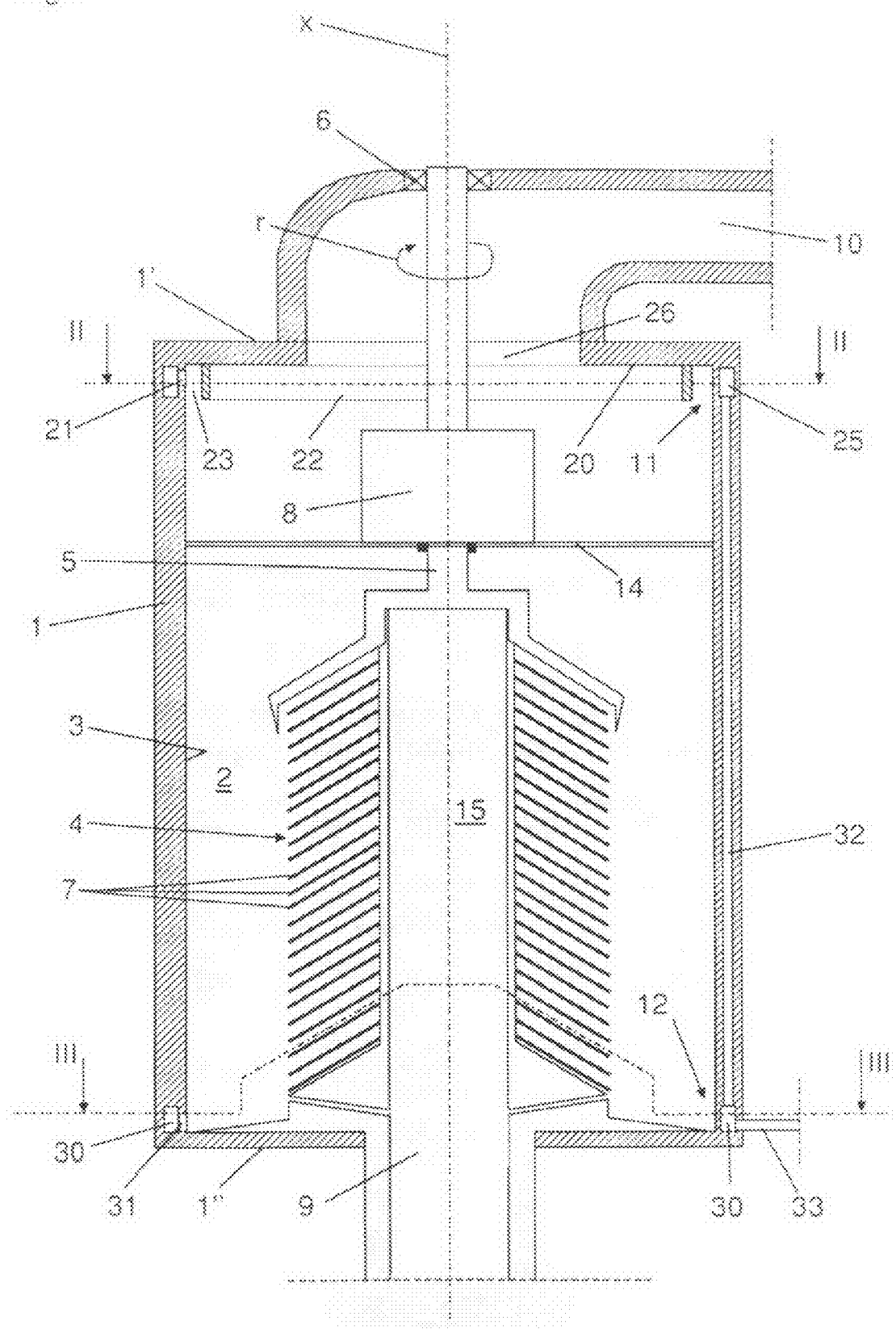
FIG. 1 discloses a vertical section through a centrifugal separator according to a first embodiment of the invention.
Figure 2:
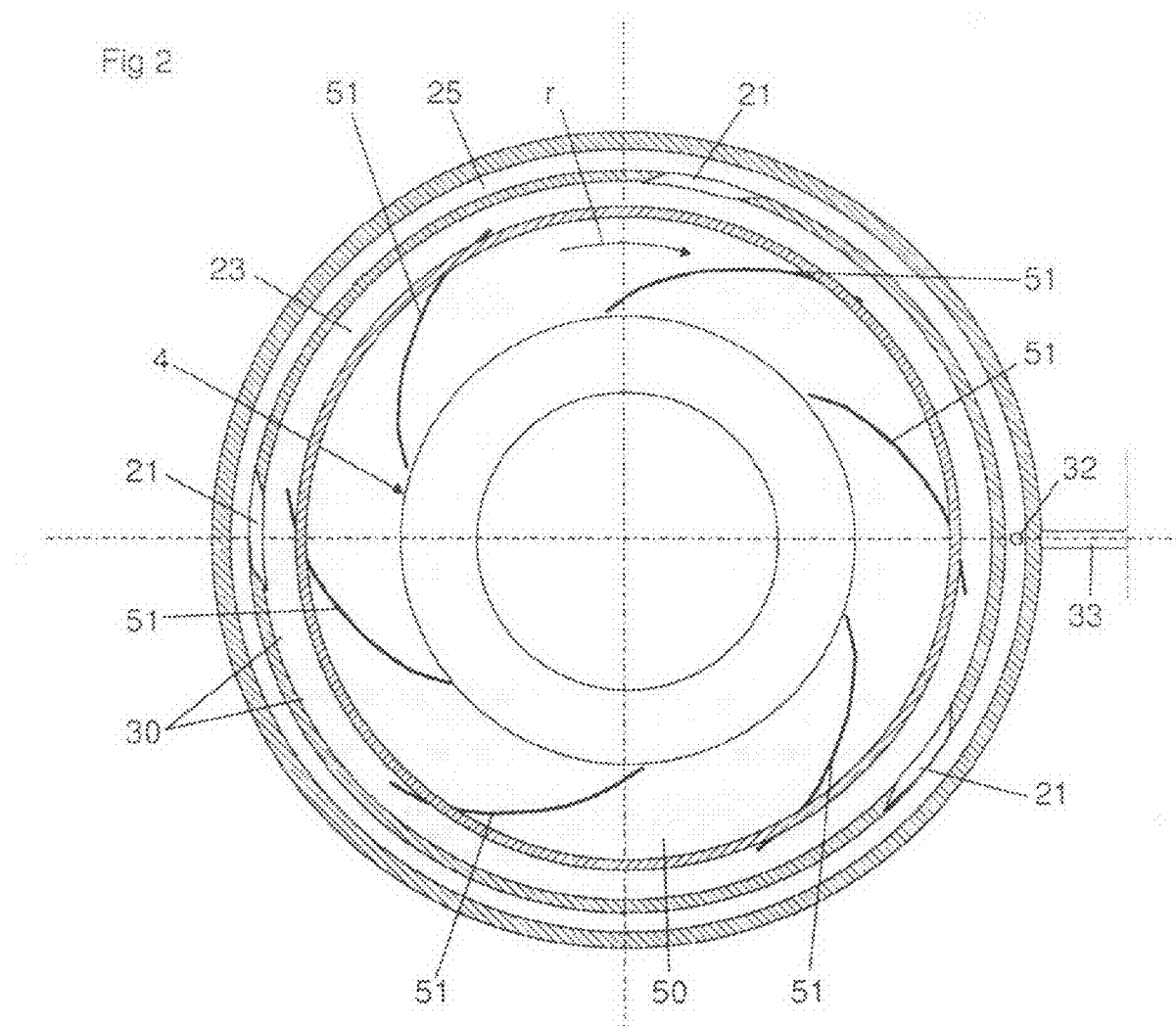
FIG. 2 discloses a cross-section along the line II-II in FIG. 1.

FIGS. 1 and 2 disclose a centrifugal separator for cleaning a gas containing liquid impurities, for instance oil in the form of oil mist or oil particles, and possibly solid particles. The centrifugal separator comprises a stationary casing, which encloses a substantially closed separation space 2. The casing 1 has an inner wall surface 3, which faces the separation space 2. The separation space 2 is arranged to permit the gas to flow therethrough.

The centrifugal separator also comprises a rotating member 4, which is provided in the separation space 2 and arranged to rotate in a direction r of rotation around an axis x of rotation, which also forms a centre axis through the casing 1. The centrifugal separator is provided in such a way that the axis x of rotation extends substantially vertically so that the stationary casing 1 has an upper end 1' and a lower end 1".

The rotating member 4 comprises a spindle member 5, which is journalled in the casing 1 in the proximity of the upper end 1' by means of a bearing 6, and a number of separating discs 7. In the embodiment disclosed, the separating discs 7 are conical and extend obliquely downwardly and outwardly from the spindle member 5. The invention is also applicable to rotating members having completely radial separating discs or separating discs extending in axial planes from the spindle member 5.

The rotating member 4 is driven by means of a drive member 8, for instance an electrical motor, and is adapted to bring the gas to rotation in the direction r of rotation for separating, by means of centrifugal forces, the liquid impurities from the gas. In the first embodiment, the drive member 8 is mounted in the separation space 2 by means of a support device 14, which for instance may comprise three or four rods extending radially from the drive member 8 to the inner wall surface 3, where they are mounted in a suitable manner.

In the embodiment disclosed, the centrifugal separator also comprises an inlet 9 for the gas to be cleaned, a gas outlet 10 for the cleaned gas, a first liquid outlet 11 for the separated liquid impurities and a second liquid outlet 12 for the separated liquid impurities.

The inlet 9 is centrally provided and extends through the lower end 1" of the casing 1. The inlet 9 conveys the gas into a central space 15 of the rotating member 4. From this central space 15, the gas is conveyed radially outwardly to the gaps formed between the separating discs 7. The gas outlet 10 is provided at the upper end 1' of the casing 1 downstream the rotating member 4. The gas leaving the gaps between the separating discs 7 thus rotates at a high rotary speed in the direction r of rotation and will continue this rotating movement upwardly to the gas outlet 10 where the cleaned gas leaves the separation space 2.

The first liquid outlet 11 is provided upstream the gas outlet 10 with respect to the gas flow. The second liquid outlet 12 is provided at the lower end 1" of the casing 1 and, with respect to the gas flow, upstream the first liquid outlet 11. In the embodiments disclosed, the second liquid outlet 12 forms a main outlet, which is adapted for discharge of a main part of the liquid impurities, and the first liquid outlet 11 a residual outlet, which is adapted for discharge of substantially all residual liquid impurities. It is to be noted that the separated liquid impurities may comprise solid particles which are discharged via the liquid outlets 11 and 12.

The centrifugal separator also comprises an annular surface 20, which extends inwardly from the inner wall surface 3. In the first embodiment, the annular surface 20 is formed by the upper end wall of the separation space 2. The annular surface 20 is in the first embodiment substantially plannar and perpendicular to the axis x of rotation, i.e. the annular surface 20 is parallel with a cross-sectional plane through the centrifugal separator. The annular surface may also be slightly conical or somewhat domed.

The first liquid outlet 11 comprises at least one outlet hole 21, which extends outwardly through the inner wall surface 3. In the first embodiment, the first liquid outlet 11 comprises three such outlet holes 21, see FIG. 2, but the number may be varied and be for instance also 2, 4, 5 or more outlet holes 21.

The first liquid outlet 11 also comprises an annular shield element 22, which extends from the annular surface 20 at a distance from the inner wall surface 3 and the outlet holes 21. As can be seen in FIG. 1, the annular shield element 22 is located radially inside the outlet hole 21, i.e. the shield element 22 covers the outlet holes completely or substantially completely seen in a radial direction from the axis 2 of rotation. The shield element 22 in the first embodiment extends substantially in parallel with the axis of rotation x, but may also be inclined at least slightly in relation to the axis x of rotation.

The annular shield element 22 and the annular surface 20 together with the inner wall surface 3 thus form an annular groove 23 which is located radially inside the outlet holes 21. The groove 23 has an open annular upstream end and a closed annular downstream end. In the first embodiment, the annular surface 20 extends inwardly from the annular shield element 22, i.e. passes the shield element 22.

Furthermore, the first liquid outlet 11 comprises a first annular collecting channel 25, which extends in a peripheral direction around the separation space 2 radially outside and at the level of the groove 23. The first annular collecting channel 25 is provided in the wall of the stationary casing 1. The groove 23 communicates with the first annular collecting channel 25 via the outlet holes 21, which thus extend between and connect the groove 23 and the first annular collecting channel 25.

The annular surface 20 comprises at lest one opening 26 located inside the annular shield element 22. The opening 26 is in the first embodiment configured as a central through-flow opening and forms a part of the gas outlet 10.

The second liquid outlet 12 also comprises a second annular collecting channel 30, which extends around the separation space 2 radially outside the inner wall surface 3. Furthermore, at least one outlet hole 31 is provided in such a way that it extends between the separation space 3 and the second annular collecting channel 30. The second liquid outlet 12 may for instance comprise 1, 2, 3, 4, 5, 6 or more such outlet holes 31. The second liquid outlet 12, i.e. the outlet holes 31 are provided at the lower end 1".

As can be seen in FIG. 1, the first annular collecting channel 25 of the first liquid outlet 11 is connected to the second annular collecting channel 30 of the second liquid outlet 12 via at least one connecting channel 32, which in the embodiment disclosed extends substantially in parallel with the axis x of rotation. It is of course possible to provide more than one such connecting channel 32. From the second annular collecting channel 30 also at least one discharge conduit 33 extends for discharge of the separated liquid impurities from the centrifugal separator.

Figure 3:
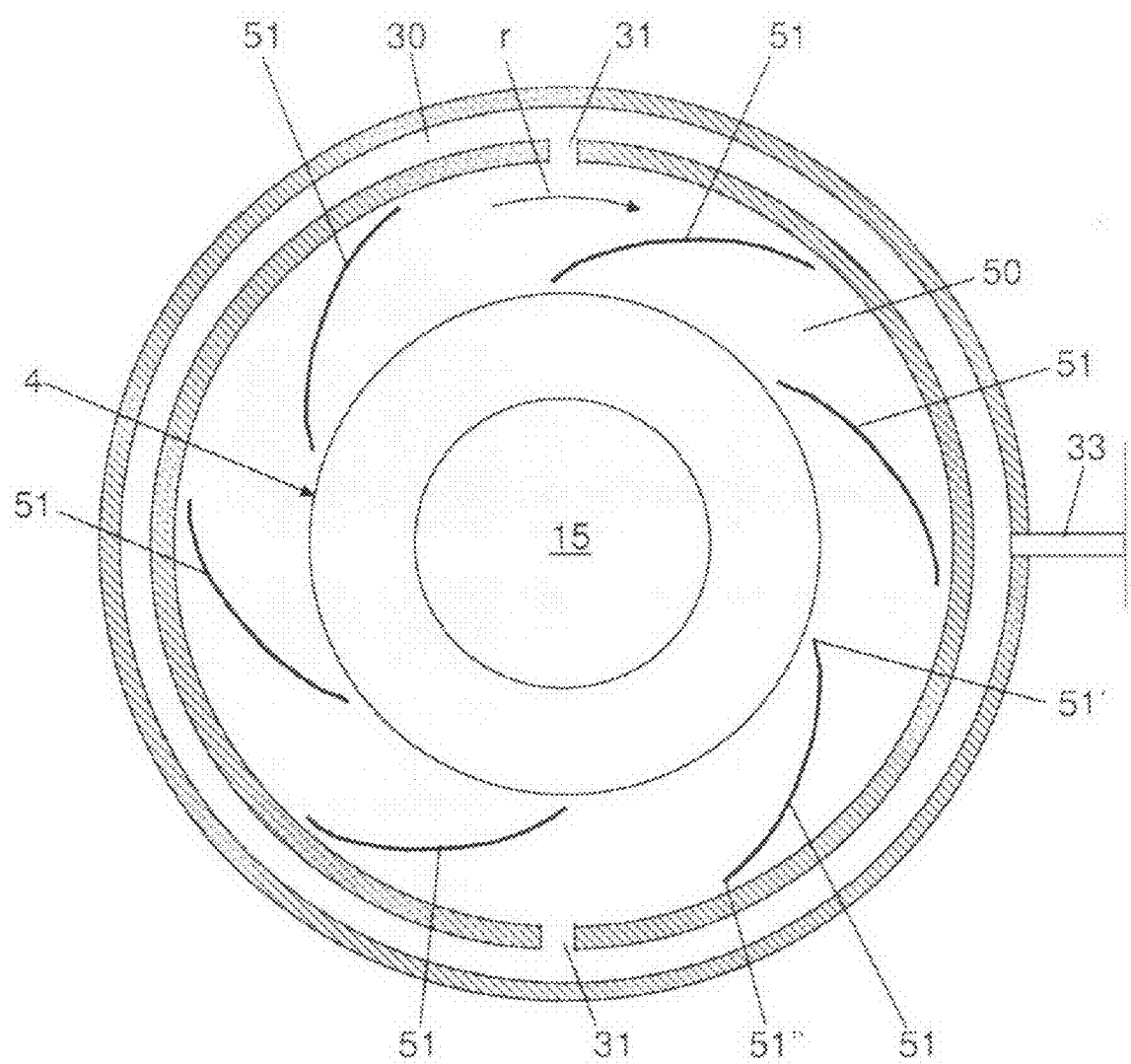
FIG. 3 discloses a cross-section along the line III-III in FIG. 1.

The centrifugal separator also comprises a lower annular end surface 50, which extends between the rotating member 4 and the inner wall surface 3. The lower end surface 50 is configured to transport liquid impurities radially outwardly to the second liquid outlet 12. The lower end surface 50 is in the embodiment disclosed slightly conical and inclined outwardly and downwardly, see FIG. 1. It is to be noted, however, that the lower end surface 50 also may be substantially plannar or even inclined somewhat upwardly and outwardly. Furthermore, the centrifugal separator comprises a number of guide elements 51, which are provided on the lower end surface 50 and arranged to promote the transport of the liquid impurities outwardly towards the inner wall surface 3 and the outlet holes 31, see FIG. 3. The guide elements 51 are, seen radially outwardly, directed forwardly in the direction r of rotation. The guide elements 51 may be straight or curved. Each guide element 51 has a first radially inner end 51' and a second radially outer end 51". The radially outer end 51" is located in the proximity of but at a distance from the inner wall surface 3 in such a way that a radial outer passage is formed between the inner wall surface 3 and the radially outer end 51", see FIG. 3. The radially inner end 51' is located in the proximity of but at a distance from an annular inner end of the annular surface 50 in such a way that a radially inner passage is formed between the annular inner end and the radially inner end 51' of each guide element, see FIG. 3.

The centrifugal separator disclosed may for instance be used for cleaning of gas containing oil in the form of oil particles and/or oil mist. The gas to be cleaned may be fed via the inlet 9 to the space 15. Due to the rotation of the rotating member 4, the gas will also be sucked into the gaps between the separating discs 7, wherein oil will be attached to these discs 7 and due to the centrifugal force be transported outwardly on the discs 7. The oil will then leave the discs 7 and be thrown against the inner wall surface 3. The oil will then flow downwardly on the inner wall surface 3 down to the lower end surface 50 and the second liquid outlet 12 where the oil will flow out through the outlet holes 31 into the second annular collecting channel 30. A part of the oil hitting the inner wall surface 3 will, due to the gas flow from the rotating member upwardly to the gas outlet 10, be transported upwardly along the inner wall surface 3. This oil will flow down into the groove 23 and be conveyed into the first annular collecting channel 25 via the outlet holes 21. From the first annular collecting channel 25, the separated oil is then transported down to the second annular collecting channel 30. All separated oil is thus transported to this collecting channel 30, and from there out of the centrifugal separator via the discharge conduit 33.

Figure 4:
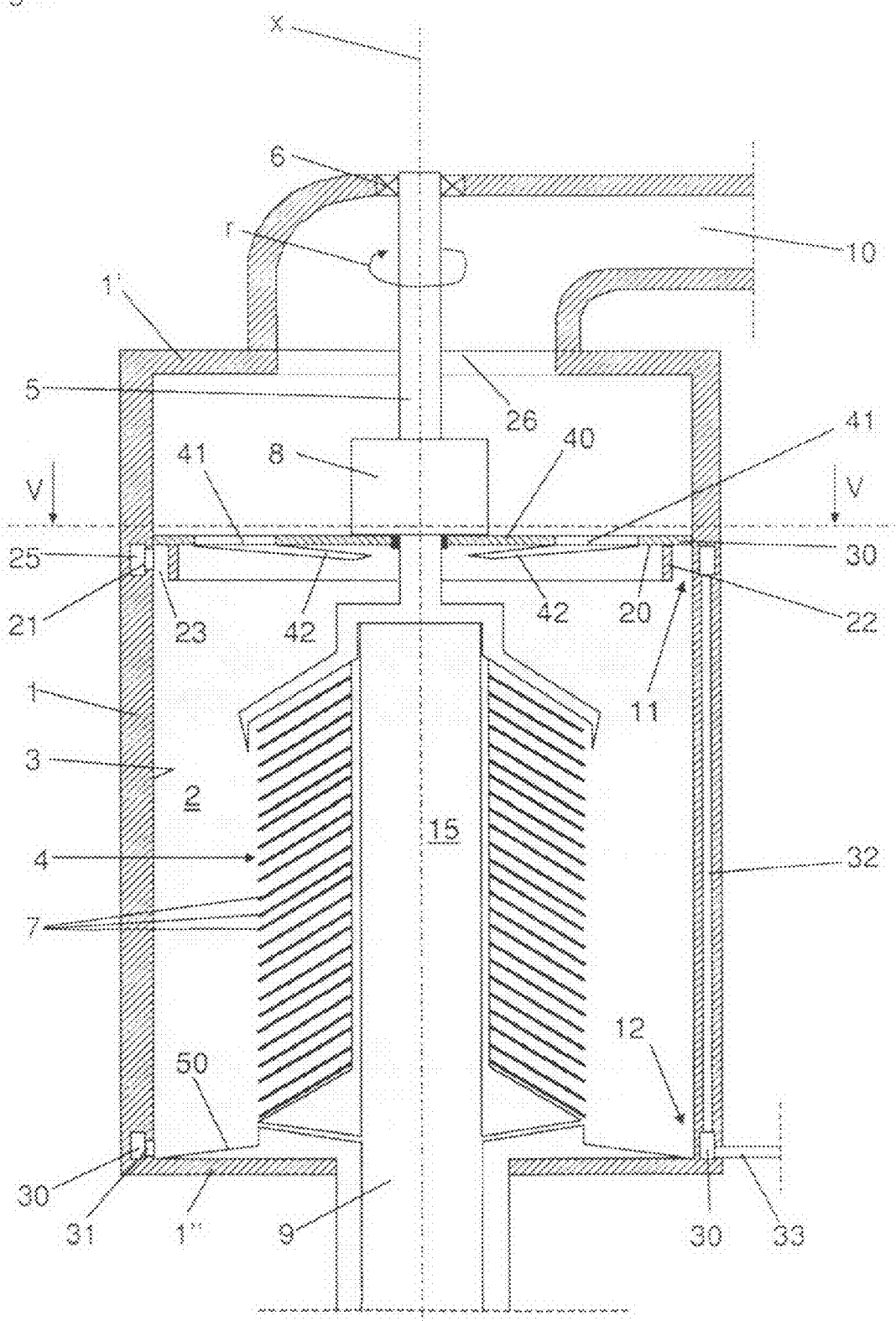
FIG. 4 discloses a vertical section through a centrifugal separator according to a second embodiment of the invention.
Figure 5:
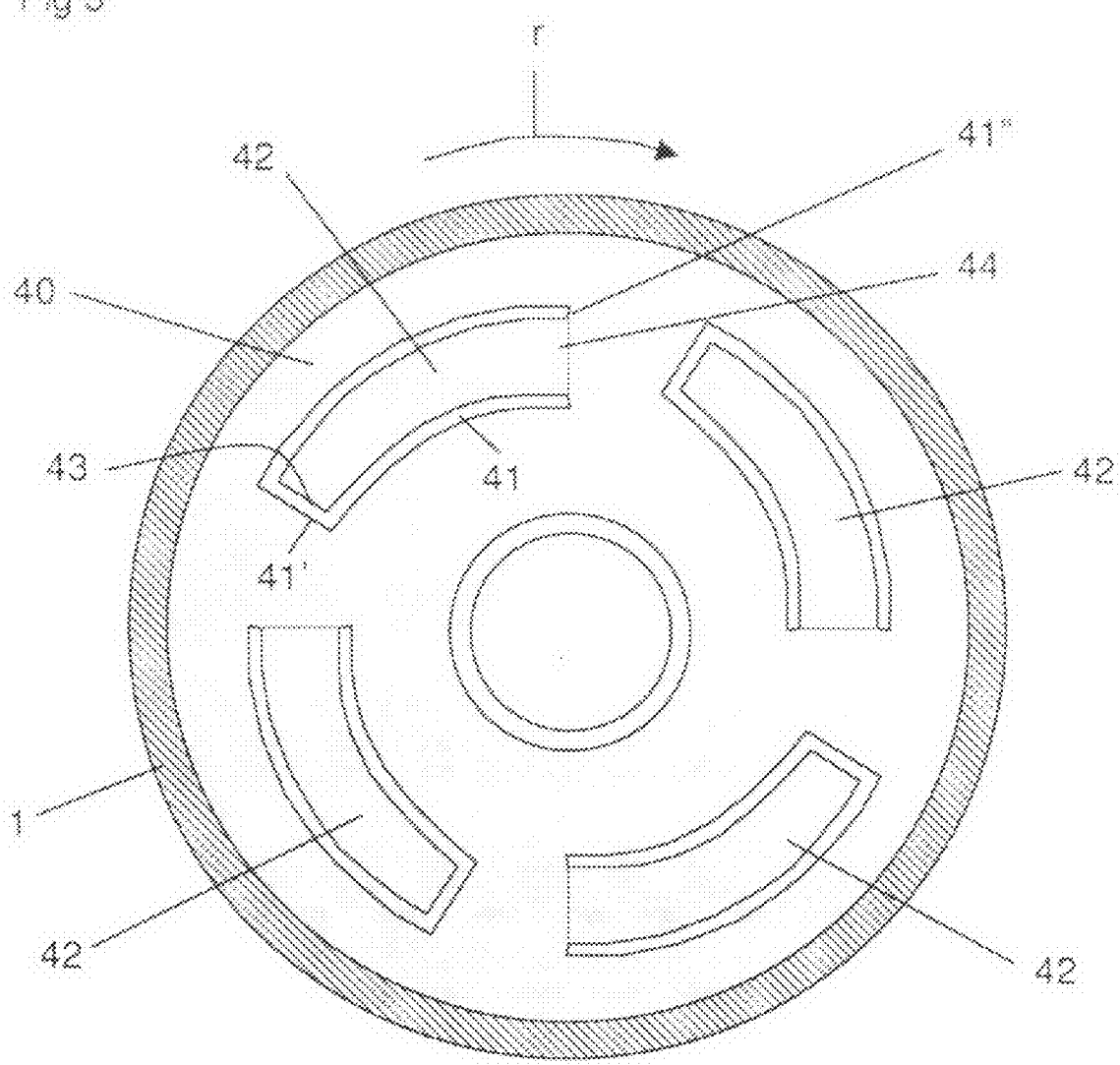
FIG. 5 discloses a cross-section along the line V-V in FIG. 1.

FIG. 4 discloses a second embodiment. It is to be noted that elements having substantially the same function have been given the same reference signs in the two embodiments. The second embodiment differs from the first embodiment in that the centrifugal separator comprises a disc 40, which is provided between the rotating member 4 and the gas outlet 10. The disc 40 is provided with a number of through-flow openings 41, in the second embodiment four through-flow openings 41, see FIG. 5. It is to be noted, however, that the disc may comprise more or less such through-flow openings 41, for instance 2, 3, 5, 6, 7 or more through-flow openings 41. Each through-flow opening comprises a forward edge 41' and a rearward edge 41" with respect to the direction r of rotation, see FIG. 5. Each through-flow opening 41 also comprises a tongue 42 which projects from the rearward edge 41 of the through-flow opening 41. As can be seen from FIG. 4, each tongue 42 projects from the edge 41" in such a way that the tongue 42 is located upstream the disc 40, i.e. each tongue 42 has an outer end 43 located between the disc 40 and the rotating member 4. Each tongue 42 also has an inner end 44 which coincides with the rearward edge 41". Each tongue 42 thus projects from the respective rearward edge 42" towards the direction r of rotation. As furthermore can be seen in FIG. 5, each through-flow opening 41 has a substantially arched extension in the direction r of rotation. Also each tongue 42 has a substantially arched extension in the direction r of rotation. The disc 40 is in the embodiment disclosed substantially plannar and parallel with a cross-sectional plane through the centrifugal separator. The axis x of rotation forms the normal to this cross-sectional plane. Each tongue 40 is inclined at an angle α of inclination in relation to the cross-sectional plane. The angle α of inclination may be varied and be between 1° and 40°.

The disc 40, in the second embodiment, the annular surface 20, wherein the annular shield element 22 extends in an upward direction, i.e. downwardly in the second embodiment, from the disc 40 and the annular surface 20. The groove 23 is thus formed by the shield element 22, the inner wall surface 3 and the annular surface 20 of the disc 40.

The gas leading the gaps between the separating discs 7 thus rotates at a very high rotary speed in the direction r of rotation. This rotating movement will continue until the gas reaches the disc 40. The tongues 42 will then function as guide vanes and guide gas in through the through-flow openings 41. When the gas passes through the through-flow openings 41, the high rotary speed will be decelerated and converted to an axial flow velocity. In such a way a large flow of gas may be conveyed axially upwardly towards the gas outlet 10. It is to be noted that all gas flowing from the inlet 9 to the gas outlet 10 will be conveyed through the through-flow openings 31 of the disc 40 and thrown against the inner wall surface 3. The liquid impurities will then flow downwardly on the inner wall surface 3 to the lower end of the separation space 2 and the second liquid outlet 12 where the liquid impurities will flow out into the second annular collecting channel 30. A part of the liquid impurities which hit the inner wall surface 3 will, due to the gas flow from the rotating member 4 upwardly towards the disc 40, be transported upwardly along the inner wall surface 3. These liquid impurities will flow downwardly along the inner wall surface 30 and into the groove 30 and from there into the first annular collecting channel 25 via the outlet holes 21.

The invention is not limited to the embodiments disclosed but may be varied and modified within the scope of the following claims.

What is claimed is:

1. A centrifugal separator for cleaning of a gas containing liquid impurities, wherein the centrifugal separator comprises:
    a stationary casing, which encloses a separation space and has an inner wall surface facing the separation space, wherein the separation space permits the gas to flow therethrough;
    an inlet for the gas to be cleaned;
    a rotating member, which is provided in the separation space downstream of the inlet with respect to the gas flow and arranged to rotate in a direction (r) of rotation around an axis (x) of rotation, wherein the rotating member is adapted to bring the gas to rotation in the direction (r) of rotation for separation, by means of centrifugal forces, of at least a part of the liquid impurities from the gas;
    a gas outlet, which with respect to the gas flow is provided downstream the rotating member for discharge of the cleaned gas;
    at least a first liquid outlet for discharge of the liquid impurities, wherein the first liquid outlet comprises at least one outlet hole extending through the inner wall surface; and
    an annular surface, which extends inwardly from the inner wall surface and is located downstream the outlet hole, the first liquid outlet having an annular shield element, which extends from the annular surface at a distance from the outlet hole and which is located radially inside the outlet hole, and wherein the annular shield element and the annular surface form an annular groove which is located radially inside the outlet hole.

2. A centrifugal separator according to claim 1, wherein the groove has an open annular upstream end and a closed annular downstream end.

3. A centrifugal separator according to claim 1 wherein the annular surface extends inwardly from the annular shield element.

4. A centrifugal separator according to claim 1 wherein the first liquid outlet also comprises a first annular collecting channel extending around the separation space radially outside the groove.

5. A centrifugal separator according to claim 4, wherein the outlet hole extends between the groove and the first annular collecting channel.

6. A centrifugal separator according to claim 1, wherein the annular surface comprises at least one opening located inside the annular shield element and forming a part of the gas outlet.

7. A centrifugal separator according to claim 6, wherein said at least one opening comprises a central through-flow opening.

8. A centrifugal separator according to claim 6 wherein said at least one opening comprises a number of intermediate through-flow openings.

9. A centrifugal separator according to claim 8, wherein each such intermediate through-flow opening comprises a tongue projecting from an edge of the through-flow opening.

10. A centrifugal separator according to claim 9, wherein the tongue projects from the edge in such a way that the tongue is located upstream the annular surface.

11. A centrifugal separator according to claim 10, wherein the tongues project from the respective edge towards the direction (r) of rotation and from the annular surface towards the rotating member.

12. A centrifugal separator according to claim 8, wherein the intermediate through-flow openings and the tongues have a substantially arched extension in the direction (r) of rotation.

13. A centrifugal separator according to claim 1, wherein the annular surface is substantially plannar and substantially parallel with a cross-sectional plane through the centrifugal separator.

14. A centrifugal separator according to claim 1 wherein the centrifugal separator comprises a second liquid outlet which is provided upstream the first liquid outlet and downstream the rotating member for discharge of the separated liquid impurities.

15. A centrifugal separator according to claim 14, wherein the second liquid outlet forms a main outlet and the first liquid outlet forms a residual outlet.

16. A centrifugal separator according to claim 1, wherein the second liquid outlet comprises a second annular collecting channel extending around the separation space radially outside the inner wall surface.

17. A centrifugal separator according to claim 16, wherein the second liquid outlet comprises at least one outlet hole extending between the separation space and the second annular collecting channel.

18. A centrifugal separator according to claim 1, wherein the centrifugal separator is arranged to be provided in such a way that the axis of rotation extends substantially vertically, wherein the stationary casing has an upper end and a lower end and wherein the gas outlet is provided at the upper end.

19. A centrifugal separator according to claim 14, wherein the second liquid outlet is provided at the lower end.

20. A centrifugal separator according to claim 1, wherein the rotating member comprises a number of separating discs.

* * * * *